United States Patent
Loup et al.

(10) Patent No.: US 9,649,912 B2
(45) Date of Patent: May 16, 2017

(54) HEATING, VENTILATION AND/OR AIR CONDITIONING INSTALLATION DESIGNED TO REGENERATE A FILTER, AND METHOD OF IMPLEMENTATION

(75) Inventors: Didier Loup, Maurepas (FR); Vincent Feuillard, Le Mesnil Saint Denis (FR); Amanda Martinell, Neauphle le Château (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 657 days.

(21) Appl. No.: 13/638,189

(22) PCT Filed: Mar. 25, 2011

(86) PCT No.: PCT/EP2011/054579
§ 371 (c)(1),
(2), (4) Date: Nov. 21, 2012

(87) PCT Pub. No.: WO2011/120874
PCT Pub. Date: Oct. 6, 2011

(65) Prior Publication Data
US 2013/0059521 A1   Mar. 7, 2013

(30) Foreign Application Priority Data

Mar. 31, 2010 (FR) ...................................... 10 01316

(51) Int. Cl.
*B60H 3/06* (2006.01)
(52) U.S. Cl.
CPC ... *B60H 3/0633* (2013.01); *B60H 2003/0691* (2013.01)
(58) Field of Classification Search
CPC ................ B60H 3/0633; B60H 3/0658; B60H 2003/0691

(Continued)

(56) References Cited

U.S. PATENT DOCUMENTS

| 4,696,225 A * | 9/1987 | Weller ................. B60H 3/0633 454/158 |
| 2005/0058582 A1* | 3/2005 | Paumier ............... B60H 3/0078 422/186.04 |
| 2007/0227107 A1* | 10/2007 | Ito ...................... B01D 46/0036 55/385.3 |

FOREIGN PATENT DOCUMENTS

DE        19823796 C1   2/2000
FR        2582999 A1    12/1986
(Continued)

OTHER PUBLICATIONS

English language abstract and machine-assisted English Translation for DE 19823796 extracted from the espacenet.com database on Dec. 18, 2012, 15 pages.

(Continued)

*Primary Examiner* — Avinash Savani
*Assistant Examiner* — Vivek Shirsat
(74) *Attorney, Agent, or Firm* — Howard & Howard Attorneys PLLC

(57) ABSTRACT

The subject of the invention is a motor vehicle heating, ventilation and/or air conditioning installation (1). Said installation (1) comprises a unit (3) housing at least one blower (15) interposed between an upstream volume (16) and a downstream volume (17) which volumes are delimited by the unit (3). The upstream volume (16) houses a mixing chamber (18) provided with a mixing flap (20). The upstream volume (16) houses a filter (23). Said installation (1) is fitted with means (27, 20, 24, 25) for regenerating the filter (23). The means (27, 20, 24, 25, 14) for regenerating the filter (23) comprise an interstitial space (27) linking the upstream volume (16) and the downstream volume (17) which is created between the unit (3) and the blower (15).

12 Claims, 8 Drawing Sheets

(58) Field of Classification Search
USPC .................. 454/188, 158, 103–105; 95/148
See application file for complete search history.

(56) References Cited

FOREIGN PATENT DOCUMENTS

FR          2845642 A1     4/2004
FR          2848500 A1     6/2004

OTHER PUBLICATIONS

English language abstract and machine-assisted English Translation for FR 2845642 extracted from the espacenet.com database on Dec. 18, 2012, 39 pages.
English language abstract for FR 2582999 extracted from the espacenet.com database on Dec. 18, 2012, 16 pages.
English language abstract and machine-assisted English Translation for FR 2848500 extracted from the espacenet.com database on Dec. 18, 2012, 33 pages.
International Search Report for Application No. PCT/EP2011/054579 dated May 4, 2011, 7 pages.

* cited by examiner

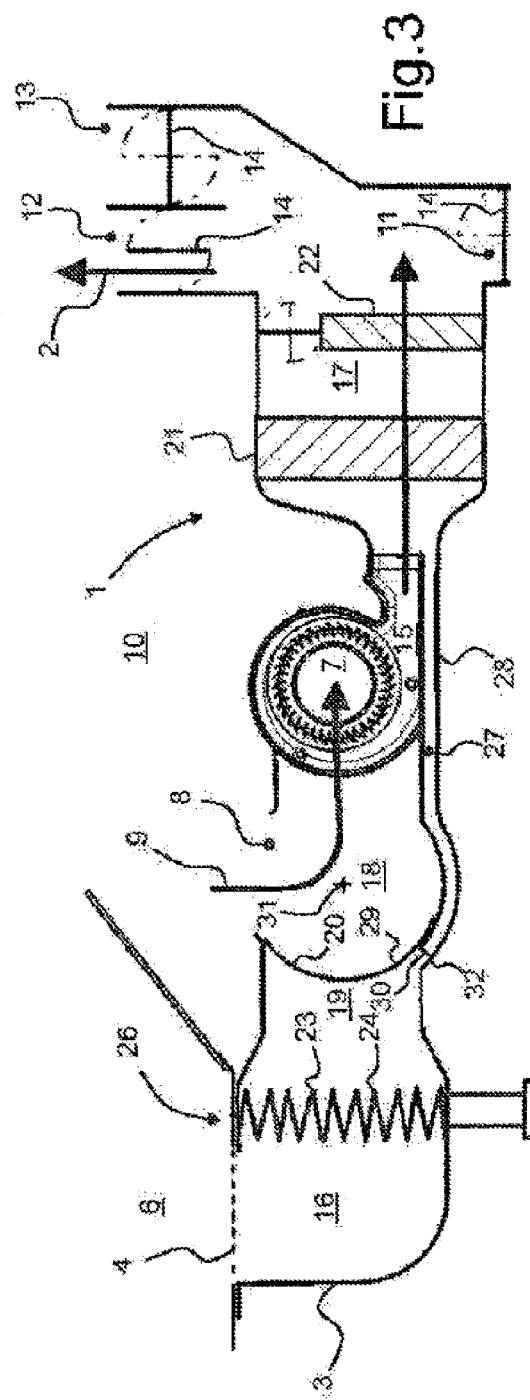
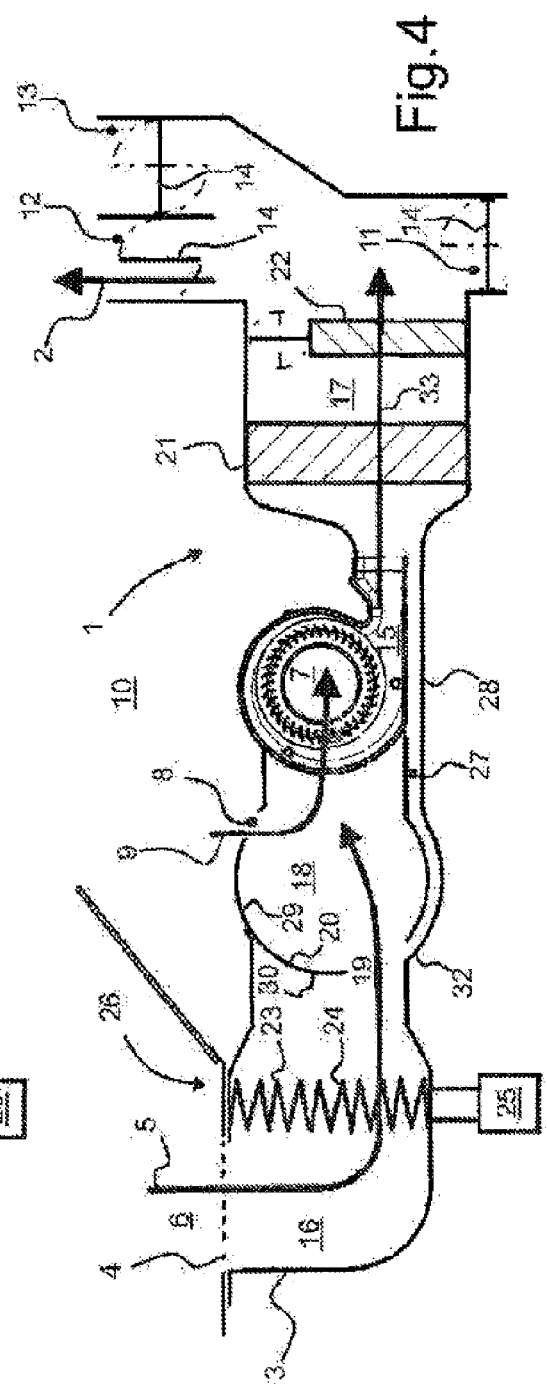

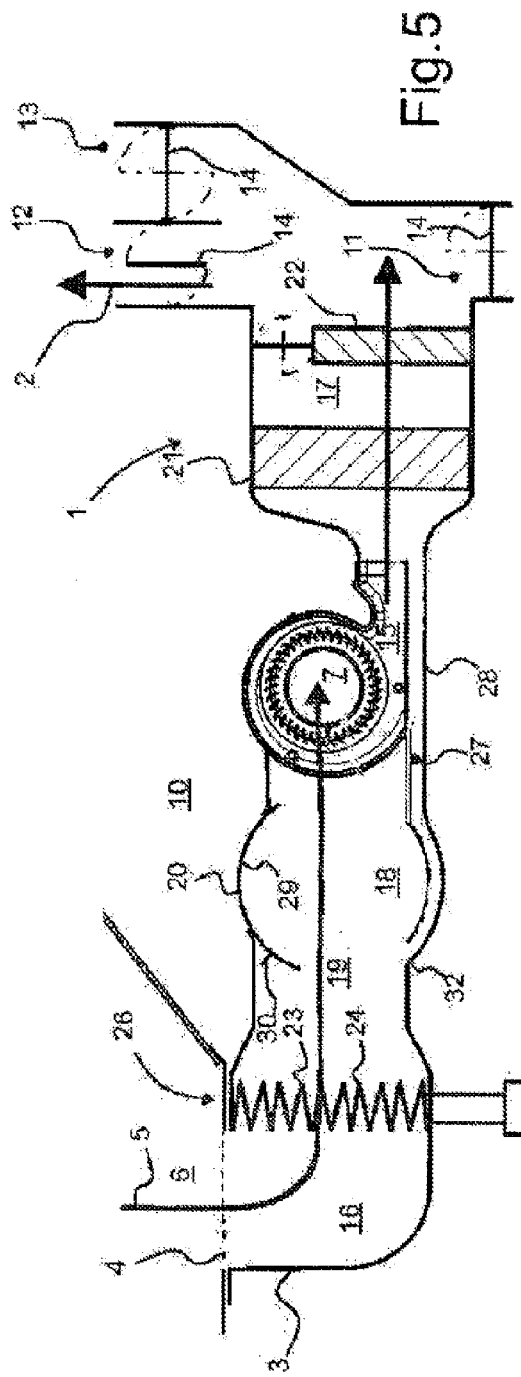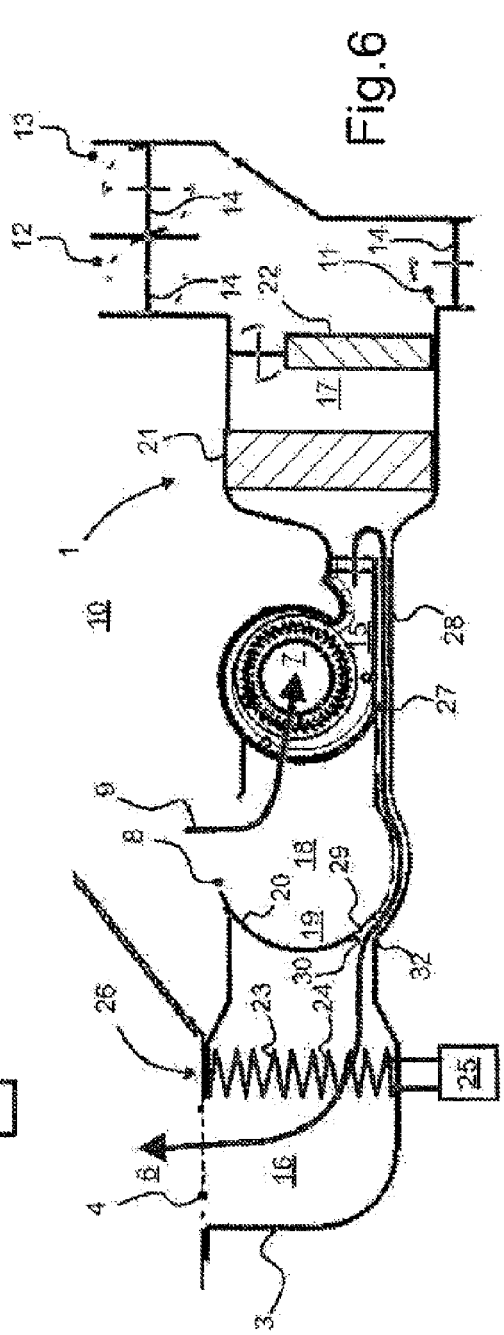

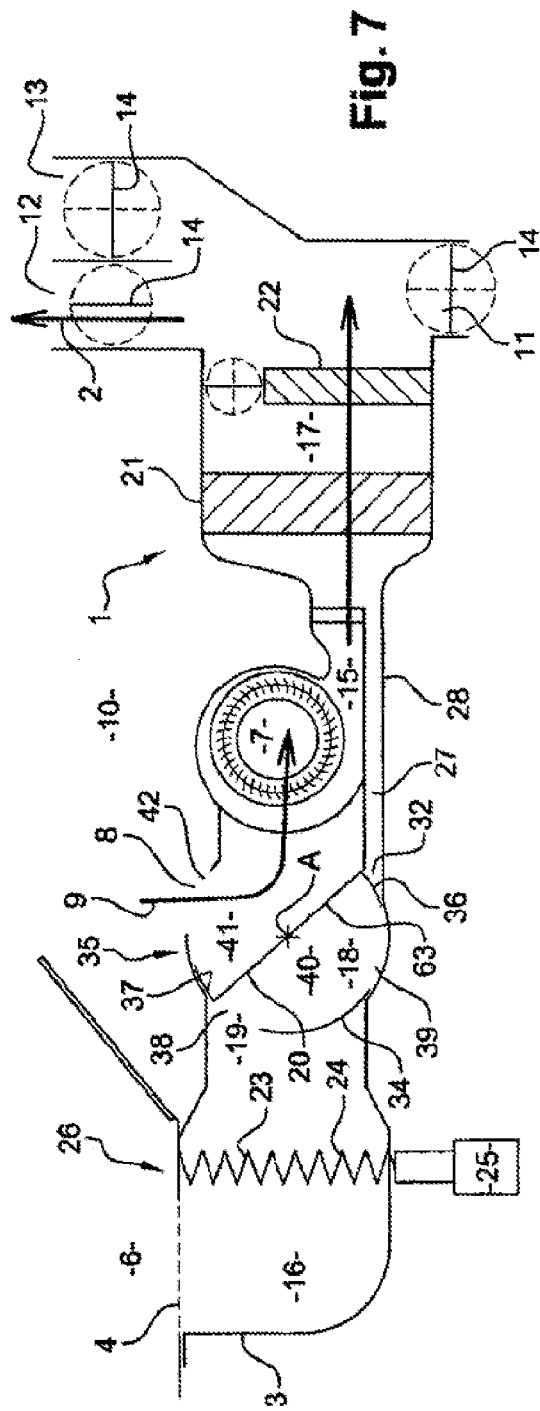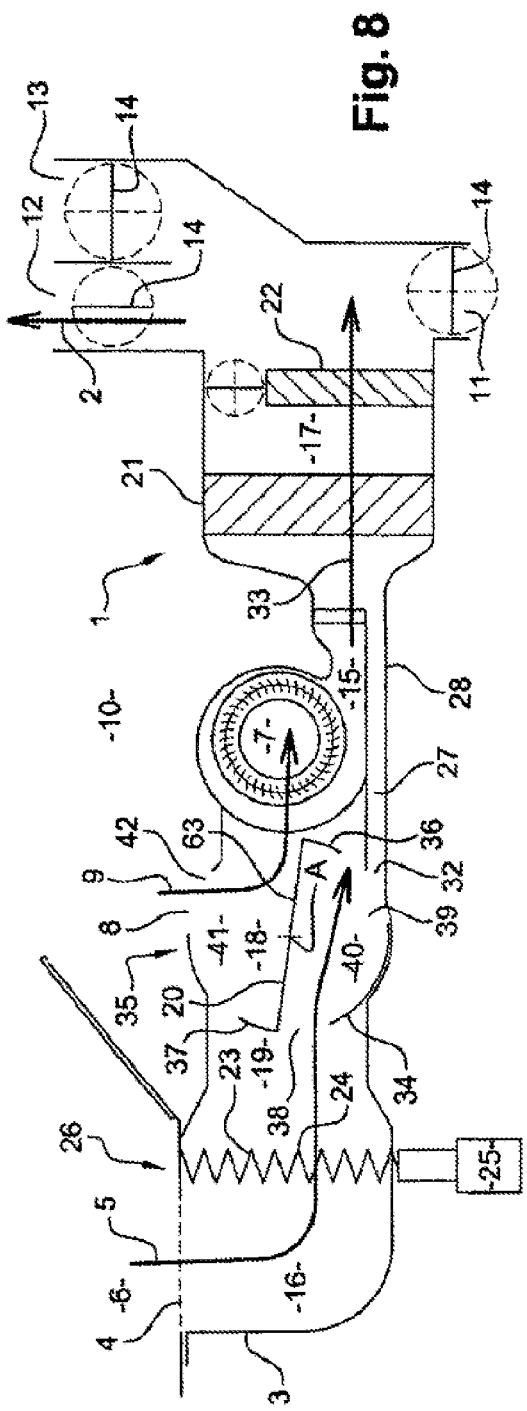

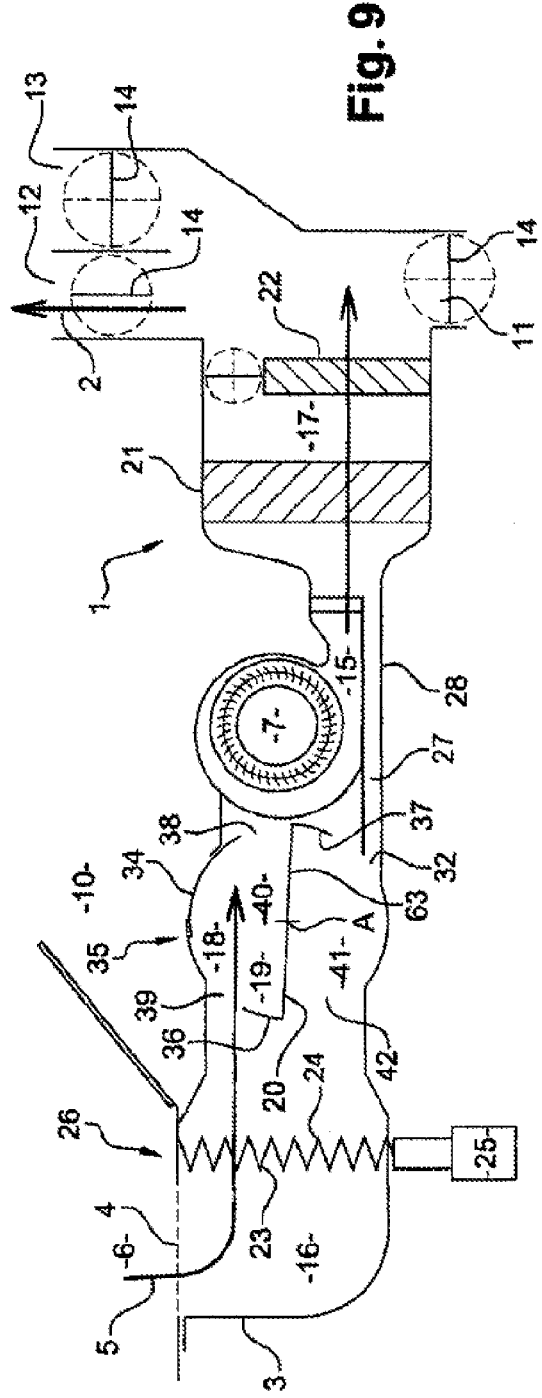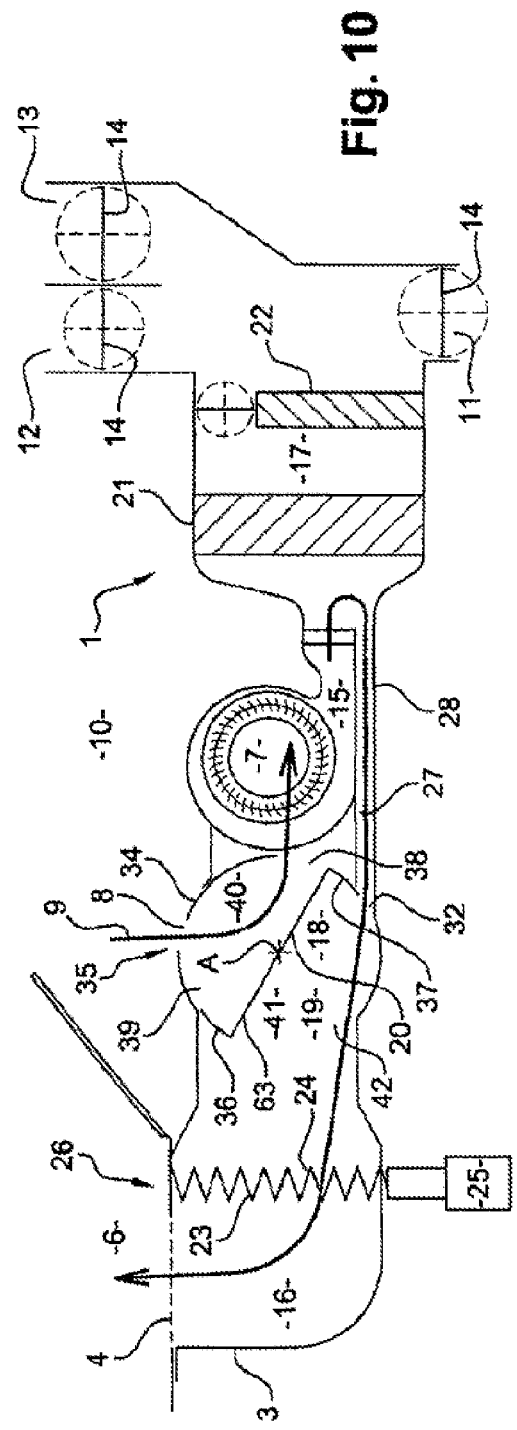

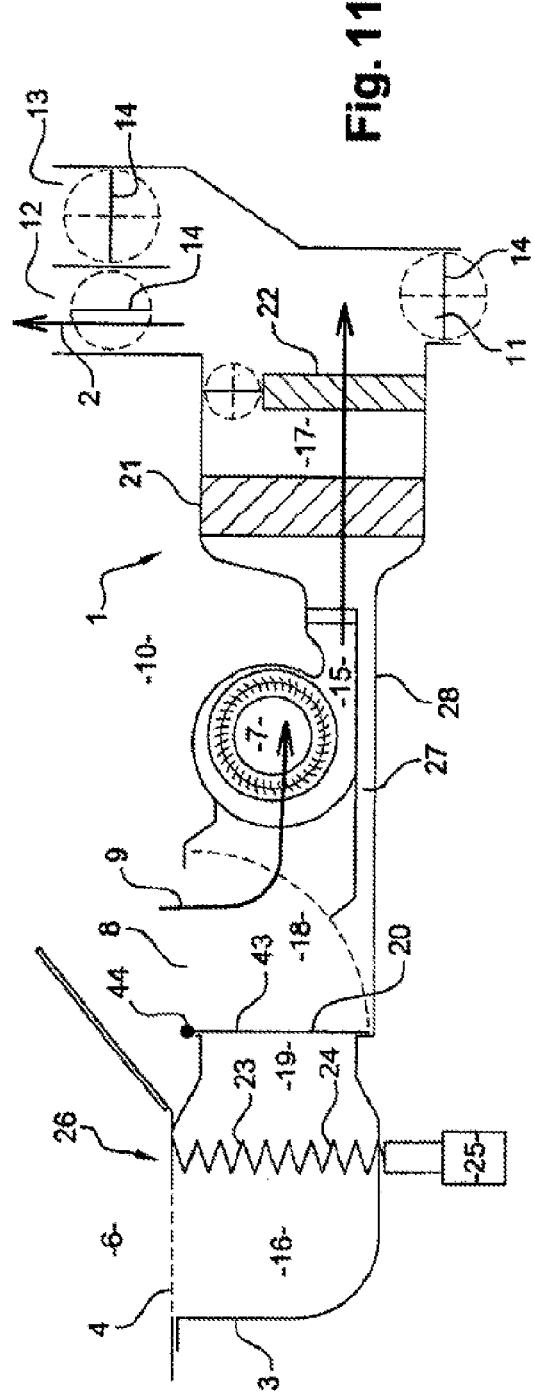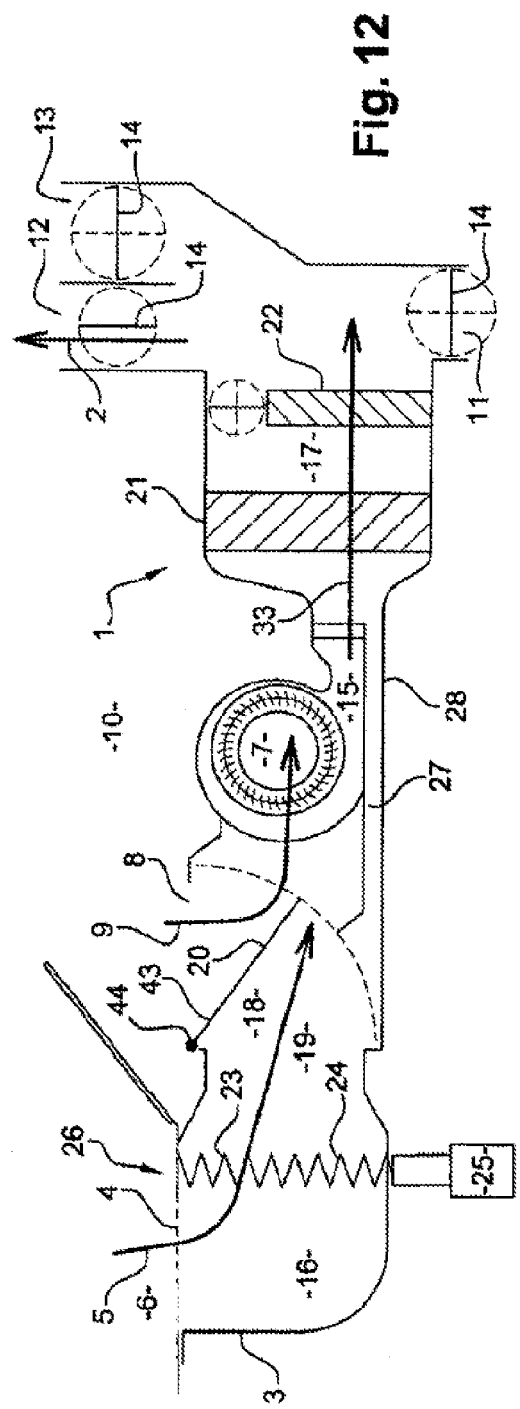

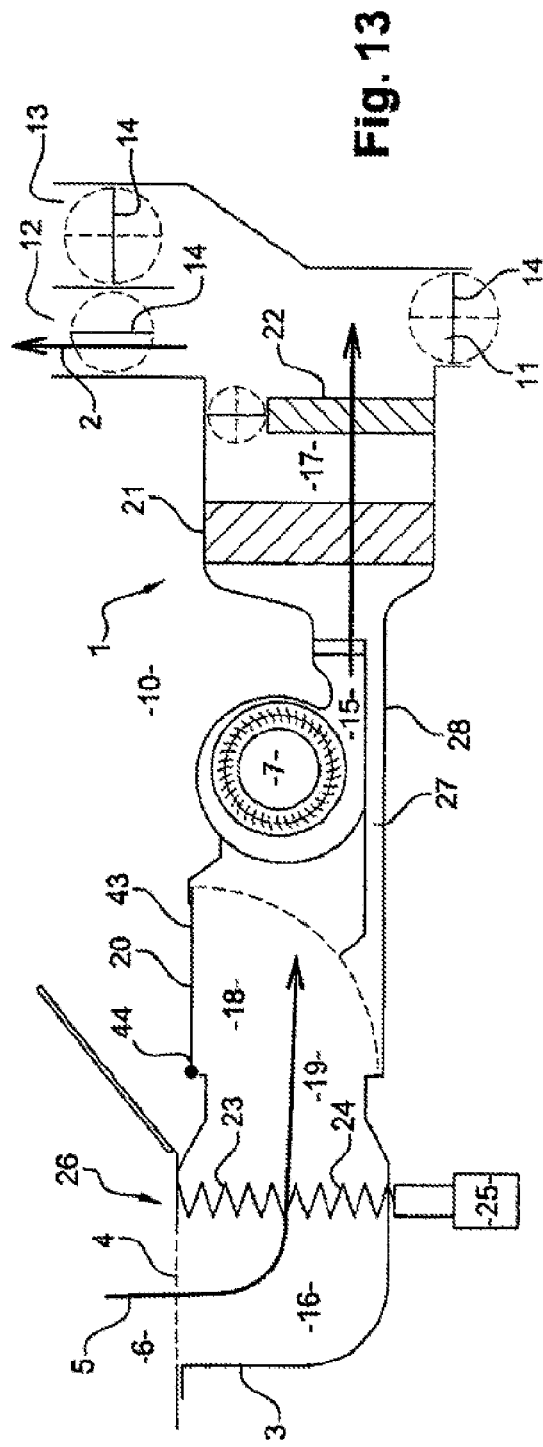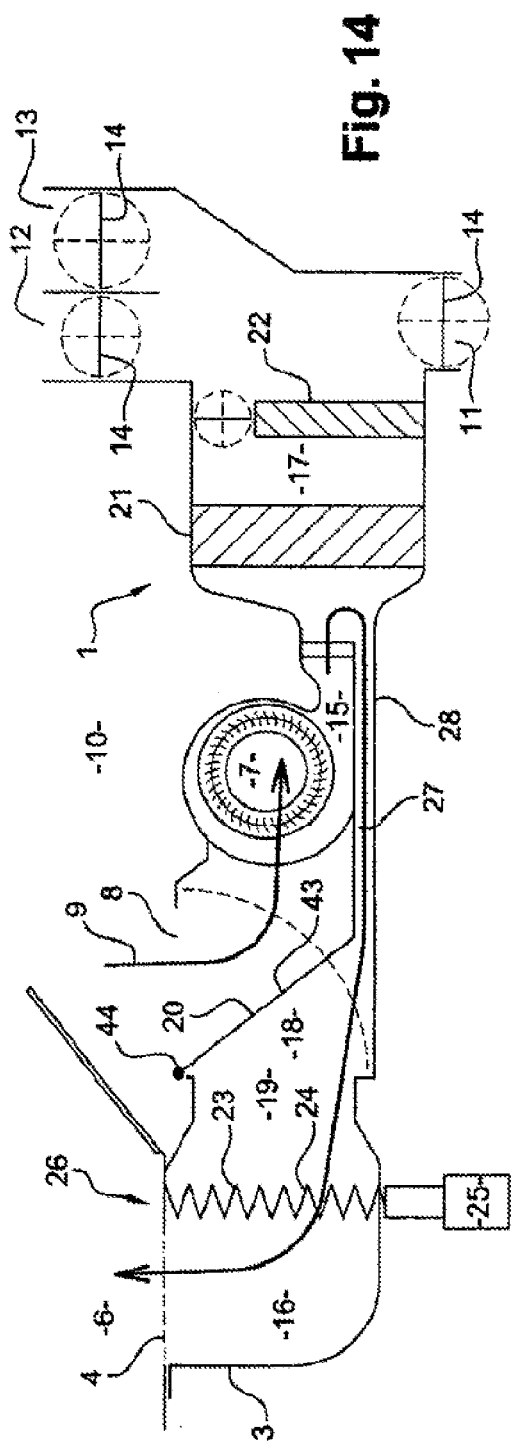

HEATING, VENTILATION AND/OR AIR CONDITIONING INSTALLATION DESIGNED TO REGENERATE A FILTER, AND METHOD OF IMPLEMENTATION

RELATED APPLICATIONS

This application is the National Stage of International Patent Application No. PCT/EP2011/054579, filed on Mar. 25, 2011, which claims priority to and all the advantages of French Patent Application No. FR 10/01316, filed on Mar. 31, 2010.

TECHNICAL FIELD OF THE INVENTION

The invention is from the field of motor vehicle heating, ventilation and/or air conditioning installations. Its subject is such an installation provided with a filter capable of collecting pollutants carried along in a flow of air circulating through said installation, the latter being provided with means for regenerating said filter. Another subject of the invention is a method for implementing said installation in filter regeneration mode.

PRIOR ART

A motor vehicle is commonly fitted with a heating, ventilation and/or air conditioning installation for modifying the aero-thermal parameters of the air contained within the vehicle interior. The installation mainly consists of a casing provided with an external-air intake vent, a recycling-air intake vent and an air delivery vent. The external-air intake vent is formed through the casing in such a way as to allow a flow of external air to be admitted into the casing from outside the vehicle. The recycling-air intake vent is formed through the casing to allow a flow of recycling air to be admitted to the casing from the vehicle interior. The casing is equipped with a recycling flap which is designed to adopt several positions between a position in which the recycling-air intake vent is fully closed and an at least partially open position. The air delivery vent is formed through the casing to allow a flow of heat treated air derived from the external-air flow and/or from the recycling-air flow to be discharged from the casing to the vehicle interior. The air delivery vent is provided with an air distribution flap which can be moved between an open position in which the air distribution flap allows air to pass through the air delivery vent and a closed position in which the air distribution flap prevents such passage of air.

The casing houses a blower capable of drawing in the external air flow and/or the recycling air flow. The casing delimits an upstream volume which is provided with the external-air intake vent and with the recycling-air intake vent. The casing also delimits a downstream volume which is provided with the air delivery vent. The blower is interposed between the upstream volume and the downstream volume to cause the either external-air and/or recycling-air flow to circulate from the upstream volume to the downstream volume.

The casing also houses heat treatment means for modifying a temperature of a drawn-in air flow, this consisting either of the external-air flow and/or of the recycling air flow, delivering the flow of heat treated air. The heat treatment means are notably a heater which is designed to heat up the drawn-in air flow and an evaporator which is able to cool the drawn-in air flow. The heat treated air flow is discharged from the casing via the air delivery vent. The means for heat treating the drawn-in air flow are housed inside the downstream volume.

It follows from this that in the so-called "normal" mode of operation of the installation, the drawn-in air flow circulates inside the upstream volume then through the blower then through the evaporator and possibly through the heater before being discharged from the casing to the vehicle interior.

The casing houses a filter able to collect the pollutants carried along in the drawn-in air flow, such as an active charcoal filter. Reference may, for example, be made to document FR 2 845 642 (PEUGEOT CITROEN AUTOMOBILES SA) which describes such an installation in which the filter is housed inside the downstream volume, more specifically between the blower and the evaporator.

The installation is provided with means of regenerating the filter which allow the pollutants already collected to be desorbed and discharged from the casing to outside the vehicle. Such means comprise a bypass line which runs between a first opening formed through the casing between the filter and the evaporator and a second opening formed through the casing between the recycling flap and the external-air intake vent. The bypass line houses an additional blower to cause a regeneration air flow to circulate from the first opening to the second opening. The first opening is fitted with a first flap that can be moved between an open position in which the first flap allows air to pass through the first opening and a closed position in which the first flap prevents such passage of air. The second opening is fitted with a second flap that can be moved between an open position in which the second flap allows air to pass through the second opening and a closed position in which the second flap prevents such passage of air.

The regeneration means also comprise a resistor with which the filter is equipped, the resistor being there to heat up the filter through a Joule effect and thereby allow the pollutants already retained to be desorbed.

In the mode of operation known as "filter regeneration" the recycling flap needs to be placed in the open position to allow the recycling air flow to pass from the vehicle interior to the upstream volume. It is necessary for the first flap and the second flap to be placed in the open position in order to allow the recycling air flow to circulate inside the bypass line. What is more, the air distribution flap has to be placed in the closed position. The resistor is switched on. Under such circumstances the recycling air flow passes through the blower, then the filter which is regenerated, then follows the bypass line to be discharged from the casing via the external-air intake vent.

Such an installation proves to be bulky because of the need for the bypass line which is arranged in a U outside the casing and tends to form an obstacle when fitting said installation. In addition, the fact that the first opening and the second opening have been made through the casing and respectively equipped with the first flap and the second flap is somewhat of a constraint.

In addition, such an installation comprises a multitude of flaps, namely a recycling flap, a first flap, a second flap and at least one air distribution flap the respective moving of which flaps is needed in order to operate said installation in "filter regeneration" mode. Having such a high number is a disadvantage as far as simple implementation of said installation is concerned.

Finally, such an installation comprises an additional blower that has to be switched on in "filter regeneration" mode and causes said installation to consume additional electrical power.

OBJECT OF THE INVENTION

The object of the present invention is to propose a heating, ventilation and/or air conditioning installation for a motor vehicle which is structurally simple, comprises a minimum number of blowers and flaps, to offer an insulation of which the implementation in "filter regeneration" mode is simple and effective while allowing the filter to be regenerated without any risk of contaminating the air contained in the vehicle interior.

An installation of the present invention is a heating, ventilation and/or air conditioning installation for a motor vehicle. Said installation comprises a casing housing at least one blower interposed between an upstream volume and a downstream volume. The upstream volume and the downstream volume are delimited by the casing. The upstream volume houses a mixing chamber provided with a mixing flap. The casing houses a filter. Said installation is equipped with regeneration means for regenerating the filter. The filter regeneration means comprise an interstitial space connecting the upstream volume and the downstream volume.

The interstitial space is advantageously adjacent to the blower and to the mixing chamber.

The regeneration means for regenerating the filter advantageously comprise the mixing flap which constitutes a means of closing off an outlet of the interstitial space into the upstream volume.

The regeneration means for regenerating the filter preferably comprise a resistor with which the filter is equipped, the resistor being associated with a source of electrical power.

The regeneration means for regenerating the filter preferably comprise at least one air distribution flap with which an air delivery vent is equipped.

The filter is, for example, housed inside the upstream volume.

The filter is, for example, interposed between the mixing chamber and the blower.

The filter is, for example, interposed between an external-air intake vent and the mixing chamber.

The filter is, for example, housed inside the downstream volume, being interposed between the blower and heat treatment means.

A method for regenerating the filter with which such an installation is equipped is mainly recognizable in that the method consists in performing the following operations:
 placing the mixing flap in a regeneration position so as to leave the outlet of the interstitial space, an external-air intake vent and a recycling-air intake vent uncovered,
 placing the air distribution flap in the closed position,
 switching on the source of electrical power of the resistor,
 switching on the blower.

DESCRIPTION OF THE FIGURES

The present invention will be better understood from reading the description of exemplary embodiments thereof given in conjunction with the figures of the attached plates, in which:

FIG. 3 to FIG. 6 are schematic illustrations of a heating, ventilation and/or air conditioning installation according to a third alternative form of embodiment of the present invention, said installation being depicted in various respective modes of operation.

FIG. 7 to FIG. 10 are schematic illustrations of a heating, ventilation and/or air conditioning installation according to a fourth alternative form of embodiment of the present invention, said installation being depicted in various respective modes of operation.

FIG. 11 to FIG. 14 are schematic illustrations of a heating, ventilation and/or air conditioning installation according to a fifth alternative form of embodiment of the present invention, said installation being depicted in various respective modes of operation.

Figure 1:
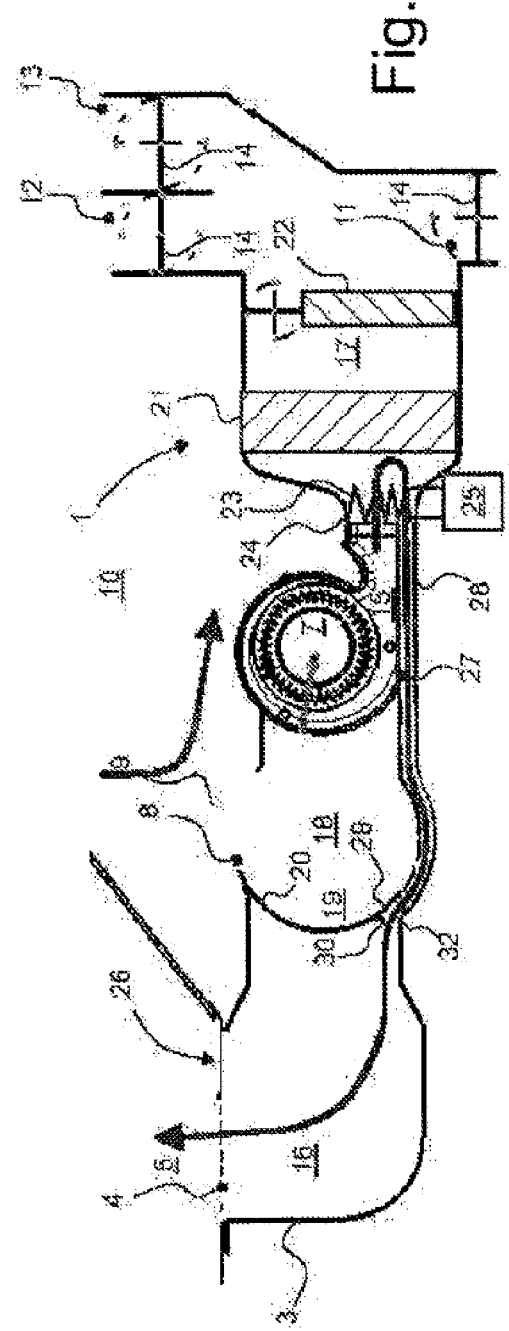
FIG. 1 is a schematic illustration of a heating, ventilation and/or air conditioning installation according to a first alternative form of embodiment of the present invention, said installation being depicted in filter regeneration mode.

In the figures, a motor vehicle is equipped with a heating, ventilation and/or air conditioning installation 1 for modifying the aero-thermal parameters of the air contained within the vehicle interior. Such modification is obtained by delivering to the vehicle interior at least one flow 2 of air that has been heat treated. To do this, said installation 1 comprises a casing 3 made of plastic and housed behind an instrument panel and/or a header tank of the vehicle. The casing 3 comprises an external-air intake vent 4 which allows a flow of external air 5 to pass between the outside 6 of the vehicle and an internal volume 7 delimited by the casing 3. The casing 3 also comprises a recycling-air intake vent 8 which allows a flow of recycling air 9 to pass between the vehicle interior 10 and the internal volume 7. The casing 3 finally comprises three air delivery vents 11, 12, 13, such as a defrosting/demisting vent 11, a head-level aeration vent 12 and a feet-level aeration vent 13. The air delivered through the defrosting/demisting vent 11 is used for ventilating a forward region of the vehicle interior in which notably the vehicle windshield is situated, the head-level aeration vent 12 is used for ventilating an upper region of the interior while the feet-level aeration vent 13 is used for ventilating a lower region of the vehicle interior. Each air delivery vent 11, 12, 13 is provided with a respective air distribution flap 14 which can be moved between an open position in which the air distribution flap 14 allows air to pass through the air distribution vent 11, 12, 13 to which the air distribution flap 14 is fitted and a closed position in which the air distribution flap 14 prevents such passage.

The casing 3 houses a blower 15 for circulating air inside the casing 3 and, more particularly, from at least one of the air intake vents 4, 8 to at least one of the air delivery vents 11, 12, 13. The blower 15 divides the internal volume 7 into two distinct volumes, one being an upstream volume 16 and the other a downstream volume 17. The upstream volume 16 is equipped with the air intake vents 4, 8 while the downstream volume 17 is provided with the air delivery vents 11, 12, 13. The upstream volume 16 comprises a mixing chamber 18 in which the external-air flow 5 and the recycling air flow 9 can be mixed with one another. The mixing chamber 18 comprises an external-air inlet vent 19 via which the external-air flow 5 from the external-air intake vent 4 enters the mixing chamber 18. The mixing chamber 18 is also provided with the recycling-air intake vent 8 so that the recycling air flow 9 enters the mixing chamber 18 directly from the vehicle interior 10 via the recycling-air intake vent 8. The casing 3 is equipped with a mixing flap 20 which can be moved between at least one recycling position in which the mixing flap 20 closes off the external-air inlet vent 19 and an external position in which the mixing flap 20 closes off the recycling air intake vent 8. The mixing flap 20 can be placed in an intermediate position in which the mixing flap 20 partially closes off the external-air inlet vent 19 and the recycling air inlet vent 8.

The casing 3 also houses the means 21, 22 for heat treating the air before it is discharged from the casing 3 to the vehicle interior 10. The heat treatment means 21, 22 are, notably, an evaporator 21 designed to cool the air that passes through it and a heater 22 capable of heating this air up. The heater 22 is possibly associated with resistors of the positive temperature coefficient type, commonly known as "PTC resistors". The heat treatment means 21, 22 are positioned inside the downstream volume 17.

The casing 3 finally houses a filter 23 capable, notably by adsorption of holding back the pollutants carried along in the air circulating inside the casing 3. The filter 23 is, for example, an active charcoal filter which is provided with a resistor 24 connected to a source 25 of electrical power. Use of the latter allows the resistor 24, and therefore the filter 23, to be heated through Joule effect. Such heating of the filter 23 to a temperature of the order of 60° C. to 120° C. causes the pollutants to desorb. As an alternative, the filter 23 is itself electrically conducting so that the resistor 24 consists of the filter 23 itself, passing an electrical current delivered by the source 25 of electrical power allowing the pollutants to be desorbed without the need to equip the filter 23 with a resistor.

The installation 1 of the present invention advantageously houses an interstitial space 27 which is formed inside the casing 3 to allow air to pass from the upstream volume 16 to the downstream volume 17 or vice versa from the downstream volume 17 to the upstream volume 16. The interstitial space is included within the casing 3. The interstitial space 27 is notably formed between a wall 28 delimiting the casing 3 and the blower 15. The wall 28 is, for example, a lower wall of the casing 3 which contributes to delimiting the internal volume 7. The interstitial space 27 is of substantially rectilinear configuration and runs longitudinally along the blower 15, the mixing chamber 18, and possibly the filter 23, but inside the casing 3. The interstitial space 2 constitutes a path bypassing the blower 15, the mixing chamber 18 and possibly the filter 23, to return air that has passed through these elements from the downstream volume 17 to the upstream volume 16 avoiding this air having to pass through the heat treatment means 21, 22 in order to avoid pressure drops.

The interstitial space 27 comprises an outlet 32 formed inside the upstream volume 16. The interstitial space 27 is an empty volume containing no blower or the like. The interstitial space 27 is not equipped with any flap or the like capable of preventing air from passing through the interstitial space. The latter generates no additional bulk in comparison with the casing 3 as it is formed within the latter.

In FIG. 1 to FIG. 6 the mixing flap 20 is a drum flap comprising a cylindrical portion 29 provided with a shut-off plate 30 that shuts off the outlet 32 from the interstitial space 27. The shut-off plate 30 is, for example, formed radially with respect to an axis of rotation 31 of the mixing flap 20. The shut-off plate 30 is designed to come into abutment against the outlet 32 of the interstitial space 27. These arrangements are aimed at preventing air from circulating from the upstream volume 16 and the downstream volume 17 through the interstitial space 27 in the "full recycling" mode. These arrangements are also aimed at allowing air to circulate from the upstream volume 16 and the downstream volume 17 through the interstitial space 27 in the "partial recycling" or "full external" mode. These arrangements are also aimed at allowing air to circulate from the downstream volume 17 and the upstream volume 16 via the interstitial space 27 in "regeneration" mode.

In FIG. 1, the filter 23 is housed inside the downstream volume 17, being interposed between the blower 15 and said heat treatment means 21, 22. The interstitial space 27 is adjacent to the mixing chamber 18, to the blower 15 and to the filter 23. The interstitial space 27 is, for example, formed along the mixing chamber 18, the blower 15 and one end of the filter 23. These arrangements are such that the filter 23 is able to hold back dust originating from the blower 15. The filter 23 is also able to hold back the pollutants from a flow of recycling air and/or a flow of external air admitted to the mixing chamber 18.

In the "filter regeneration" mode of operation as illustrated in FIG. 1, the blower 15 is activated. The source 25 of electrical power is active so the filter 23 is heated to desorb the pollutants. The mixing flap 20 shuts off the external-air inlet vent 19. The mixing flap 20 is positioned in the regeneration position in which the shut-off plate 30 leaves the outlet 32 of the interstitial space 27 uncovered so that the air can flow between the downstream volume 17 and the upstream volume 16 via the interstitial space 27. The air distribution flaps 14 are all placed in the closed position.

These arrangements allow a "filter regeneration" mode of operation in which the pollutants adsorbed by the filter 23 are discharged from the casing 3 once they have been desorbed. The recycling air flow 9 enters the mixing chamber 18 via the recycling-air intake vent 8. The recycling air flow 9 then passes through the blower 15 and enters the downstream volume 17. The recycling air flow 9 then passes through the filter 23 where it collects the pollutants. Because the air distribution flaps 14 are all placed in the closed position, the downstream volume 17 is a closed space having only the interstitial space 27 through which the recycling air flow 9 can escape. This flow therefore follows the interstitial space 27 to reach the upstream volume 16. The recycling air flow 9 laden with the pollutants is then discharged from the casing 3 via the external-air intake vent 4. The result of this is that the pollutants are discharged from the casing 3 without any risk of contaminating the air contained within the vehicle interior 10.

In FIG. 2 to FIG. 14, the filter 23 is placed inside the upstream volume 16. These arrangements are such that the filter 23 is readily accessible either via the header tank or via the glove box of the vehicle.

Figure 2:
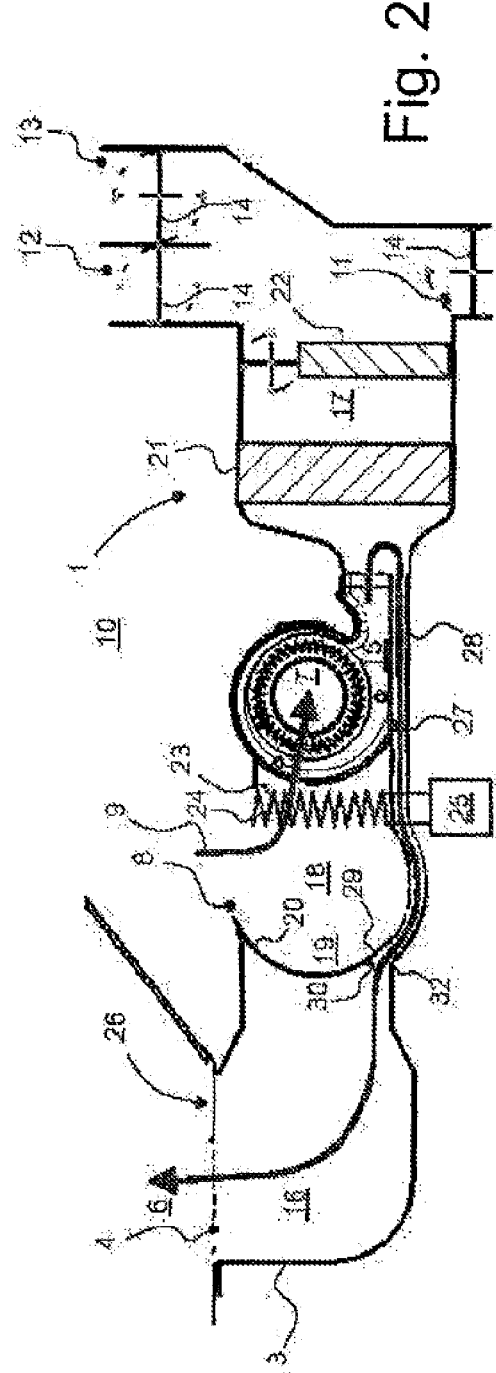
FIG. 2 is a schematic illustration of a heating, ventilation and/or air conditioning installation according to a second alternative form of embodiment of the present invention, said installation being depicted in filter regeneration mode.

More specifically in FIG. 2, the filter 23 is interposed between the mixing chamber 18 and the blower 15. That being the case, the filter 23 is able to hold back pollutants from a flow of recycling air and/or a flow of external air admitted to the mixing chamber 18.

In the "filter regeneration" mode of operation as illustrated in FIG. 2, the blower 15 is activated. The source 25 of electrical power is active which means that the filter 23 is heated to desorb the pollutants. The mixing flap 20 closes off the external-air inlet vent 19. The mixing flap 20 is placed in the regeneration position in which the shut-off plate 30 leaves the outlet 32 of the interstitial space 27 uncovered so that the air can flow between the upstream volume 16 and the downstream volume 17 via the interstitial space 27. The air distribution flaps 14 are all placed in the closed position.

These arrangements allow a "filter regeneration" mode of operation in which the pollutants adsorbed by the filter 23 are discharged from the casing 3 after they have been desorbed. The recycling air flow 9 enters the mixing chamber 18 via the recycling air intake vent 8. The recycling air flow 9 then passes through the filter 23 where it collects the pollutants. The recycling air flow 9 then passes through the blower 15 and enters the downstream volume 17. Because the air distribution flaps 14 are all placed in the closed position, the downstream volume 17 is a closed space having only the interstitial space 27 via which the recycling air flow 9 can escape. This air flow therefore follows the interstitial space 27 to reach the upstream volume 16. The recycling air flow 9 laden with the pollutants is then discharged from the casing 3 via the external-air intake vent 4. This causes the pollutants to be discharged from the casing 3 with no risk of contaminating the air contained within the vehicle interior 10.

In FIG. 3 to FIG. 6 the filter 23 is placed in an external-air passage 26 which is interposed between the external-air intake vent 4 and the external-air inlet vent 19 of the mixing chamber 18, so that in the "full recycling", "full external" and "partial recycling" mode of operation of the installation, only the external air flow 5 passes through the filter 23 before entering the mixing chamber 18.

In FIG. 3, the blower 15 is activated. The source 25 of electrical power is inactive which means that the filter 23 is not heated to desorb the pollutants. The mixing flap 20 closes off the external-air inlet vent 19 so that only the recycling air flow 9 enters the mixing chamber 18. The shut-off plate 30 closes off the outlet 32 of the interstitial space 27 so that only the blower 15 forms a passage for air between the upstream volume 16 and the downstream volume 17. At least one air distribution flap 14 is in the open position.

These arrangements allow a "full recycling" mode of operation in which only the air contained within the vehicle interior 10 is heat treated. In this mode of operation, the recycling air flow 9 enters the mixing chamber 18 via the recycling air intake vent 8 from where it is drawn in by the blower 15. The recycling air flow 9 passes through the blower 15. Next, the recycling air flow 9 is admitted to the downstream volume 17 in which the recycling air flow 9 is heat treated by the evaporator 21 and/or the heater 22. The heat treated air flow 2 is then discharged from the casing 3 to the vehicle interior 10 via at least one of the air delivery vents 11, 12, 13.

In FIG. 4, the blower 15 is activated. The source 25 of electrical power is inactive which means that the filter 23 is not heated to desorb the pollutants. The mixing flap 20 partially closes off the external-air inlet vent 19 so that the external air flow 5 enters the mixing chamber 18. The mixing flap 20 partially closes off the recycling air intake vent 8 so that the recycling air flow 9 enters the mixing chamber 18. The shut-off plate 30 leaves the outlet 32 from the interstitial space 27 uncovered so that the air can flow between the upstream volume 16 and the downstream volume 17 via the interstitial space 27. At least one air distribution flap 14 is in the open position.

These arrangements allow a "partial recycling" mode of operation in which the air contained within the vehicle interior 10 is mixed with air external to the vehicle before being heat treated. In this mode of operation, the recycling air flow 9 enters the mixing chamber 18 via the recycling air intake vent 8 from where it is drawn in by the blower 15. The external air flow 5 enters the upstream volume 16 via the external-air intake vent 4. The external air flow 5 then passes through the filter 23 which holds back the pollutants. The external air flow 5 then enters the mixing chamber 18 via the external-air inlet vent 19. The external air flow 5 and the recycling air flow 9 are mixed together in the mixing chamber 18 into a mixed air flow 33. The latter passes through the blower 15 and enters the downstream volume 17 where it is heat treated by the evaporator 21 and/or the heater 22. The heat treated air flow 2 is then discharged from the casing 3 to the vehicle interior 10 via at least one of the air delivery vents 11, 12, 13.

In FIG. 5, the blower 15 is activated. The source 25 of electrical power is inactive which means that the filter 23 is not heated to desorb the pollutants. The mixing flap 20 shuts off the recycling air intake vent 8 so that only the external-air flow 5 enters the mixing chamber 18. The shut-off plate 30 leaves the outlet 32 of the interstitial space 27 uncovered so that the air can flow between the upstream volume 16 and the downstream volume 17 via the interstitial space 27. At least one air distribution flap 14 is in the open position.

These arrangements allow a "full external air" mode of operation in which only the external air flow 5 is heat treated. The external air flow 5 enters the upstream volume 16 via the external-air intake vent 4. The external air flow 5 then passes through the filter 23 which holds back the pollutants. The external air flow 5 then enters the mixing chamber 18 via the external air inlet vent 19. The external air flow 5 passes through the blower 15 and enters the downstream volume 17 where it is heat treated by the evaporator 21 and/or the heater 22. The heat treated air flow 2 is then discharged from the casing 3 to the vehicle interior 10 via at least one of the air delivery vents 11, 12, 13.

In FIG. 6, the blower 15 is activated. The source 25 of electrical power is active which means that the filter 23 is heated to desorb the pollutants. The mixing flap 20 closes off the external-air inlet vent 19. The mixing flap 20 is placed in the regeneration position in which the shut-off plate 30 leaves the outlet 32 of the interstitial space 27 uncovered so that the air can flow between the upstream volume 16 and the downstream volume 17 via the interstitial space 27. The air distribution flaps 14 are all placed in a closed position.

These arrangements allow a "filter regeneration" mode of operation in which the pollutants adsorbed by the filter 23 are discharged from the casing 3 after they have been desorbed. The recycling air flow 9 enters the mixing chamber 18 via the recycling air intake vent 8. The recycling air flow 9 then passes through the blower 15 and enters the downstream volume 17. Because the air distribution flaps 14 are all placed in the closed position, the downstream volume 17 is a closed space having only the interstitial space 27 via which the recycling air flow 9 can escape. This air flow therefore follows the interstitial space 27 to reach the upstream volume 16. The recycling air flow 9 then passes through the filter 23 where it collects the pollutants. The recycling air flow 9 laden with the pollutants is then discharged from the casing 3 via the external-air intake vent 4.

This results in the pollutants being discharged from the casing 3 with no risk of contaminating the air contained within the vehicle interior 10. It also results in a discharge of any dust that may have been collected by the filter 23 when it was operating in "full external" mode or "partial recycling" mode from a passage of the recycling air flow 9 through the filter 23 in the opposite direction to the direction followed by the external-air flow 5 in the these two modes.

The result of these arrangements is that the mixing flap 20 and, more particularly, the shut-off plate 30 with which it is fitted, advantageously constitutes a member that allows or prevents the passage of air through the interstitial space 27 so that such a heating, ventilation and/or air conditioning installation 1 does not require the interstitial space 27 to be fitted with additional flaps.

In FIG. 7 to FIG. 10, the mixing flap 20 is a butterfly flap comprising a central plate 63 and a cylindrical part 34. The central plate 63 extends diametrically across the inside of a cylinder 35 of axis of rotation A about which the cylindrical part 34 is formed. The central plate 63 is provided with a first upstand 36 and a second upstand 37 which are formed respectively one at each of the ends of the central plate 63. The first upstand 36 and the second upstand 37 are configured as cylindrical arcs formed along the cylinder 35. The first upstand 36 and the second upstand 37 are able to allow or prevent the passage of air through the interstitial space 27. These arrangements seek to prevent air from circulating from the upstream volume 16 and the downstream volume 17 via the interstitial space 27 in "full recycling" mode. These arrangements also seek to allow air to circulate from the upstream volume 16 and the downstream volume 17 via the interstitial space 27 in "partial recycling" or "full external" mode. These arrangements also seek to allow air to circulate from the downstream volume 17 and the upstream volume 16 through the interstitial space 27 in "regeneration" mode.

The mixing flap 20 comprises a first aperture 38 formed between the central plate 63 and the cylindrical part 34, and a second aperture 39 formed between the cylindrical part 34 and the first upstand 36. The mixing flap 20 delimits a first semi-cylindrical volume 40 formed between the central plate 63, the cylindrical part 34 and the first upstand 36. The mixing flap 20 delimits a second semi-cylindrical volume 41 symmetric with the first semi-cylindrical volume 40 about the central plate 63. The second semi-cylindrical volume 41 is flanked by the central plate 63 and the second upstand 37. The mixing flap 20 comprises a third aperture 42 formed between the first upstand 36 and the second upstand 37, the third aperture 42 allowing air to circulate between the second semi-cylindrical volume 41 and the outside of the mixing flap 20.

In FIG. 7, the blower 15 is activated. The source 25 of electrical power is inactive which means that the filter 23 is not heated to desorb the pollutants. The first semi-cylindrical volume 40 is in aeraulic communication with the external-air inlet vent 19 via the first aperture 38. The central plate 63 isolates the first semi-cylindrical volume 40 from the second semi-cylindrical volume 41 so that air coming from outside 6 cannot flow to the blower 15. The second semi-cylindrical volume 41 is in aeraulic communication with the vehicle interior 10 via the recycling-air intake vent 8 which means that the recycling air flow 9 enters the second semi-cylindrical volume 41 to flow to the blower 15. The first upstand 36 closes off the outlet 32 of the interstitial space 27. At least one air distribution flap 14 is in the open position.

These arrangements allow a "full recycling" mode of operation in which only the air contained within the vehicle interior 10 is heat treated. According to this mode of operation, the recycling air flow 9 enters the second semi-cylindrical volume 41 via the recycling air intake vent 8 from where it is drawn in by the blower 15. Next, the recycling air flow 9 is admitted to the downstream volume 17 in which the recycling air flow 9 is heat treated by the evaporator 21 and/or the heater 22. The heat treated air flow 2 is then discharged from the casing 3 to the vehicle interior 10 via at least one of the air delivery vents 11, 12, 13.

In FIG. 8, the blower 15 is activated. The source 25 of electrical power is inactivate which means that the filter 23 is not heated to desorb the pollutants. The first semi-cylindrical volume 40 is in aeraulic communication with the external-air inlet vent 19 via the first aperture 38. The second semi-cylindrical volume 41 is in aeraulic communication with the external-air inlet vent 19 via the third aperture 42. The second semi-cylindrical volume 41 is in aeraulic communication with the vehicle interior 10 via the third aperture 42 and the recycling-air intake vent 8. The first upstand 36 and the second upstand 37 leave the outlet 32 of the interstitial space 27 uncovered so that the air can flow between the upstream volume 16 and the downstream volume 17 via the interstitial space 27. At least one air distribution flap 14 is in the open position.

These arrangements allow a "partial recycling" mode of operation in which the air contained within the vehicle interior 10 is mixed with external air before being heat treated. According to this mode of operation, the recycling air flow 9 enters, via the recycling air intake vent 8 and the third aperture 42, the semi-cylindrical second volume 41 which constitutes the mixing chamber 18. The external air flow 5 enters the upstream volume 16 via the external-air intake vent 4. The external air flow 5 then passes through the filter 23 which holds back the pollutants. The eternal air flow 5 then enters the mixing chamber 18 via the external-air inlet vent 19 and the third aperture 42. The external air flow 5 and the recycling air flow 9 are mixed together within the mixing chamber 18 into a mixed air flow 33. The latter passes through the blower 15 and enters the downstream volume 17 where it is heat treated by the evaporator 21 and/or the heater 22. The heat treated air flow 2 is then discharged from the casing 3 to the vehicle interior 10 via at least one of the air delivery vents 11, 12, 13.

In FIG. 9, the blower 15 is activated. The source 25 of electrical power is inactive which means that the filter 23 is not heated to desorb the pollutants. The cylindrical part 34 of the mixing flap 20 closes off the recycling-air intake vent 8 so that only the external air flow 5 enters the first semi-cylindrical volume 40. The first upstand 36 and the second upstand 37 leave the outlet 32 of the interstitial space 27 uncovered so that the air can flow between the upstream volume 16 and the downstream volume 17 via the interstitial space 27. At least one air distribution flap 14 is in the open position.

These arrangements allow a "full external air" mode of operation in which only the external air flow 5 is heat treated. The external air flow 5 enters the upstream volume 16 via the external-air intake vent 4. The external air flow 5 then passes through the filter 23 which holds back the pollutants. The external air flow 5 enters the first semi-cylindrical volume 40 via the external-air inlet vent 19 and the second aperture 39. The external air flow 5 enters the second semi-cylindrical volume 41 via the external-air inlet vent 19 and the third aperture 42. The external air flow 5 is discharged from the first semi-cylindrical volume 40 to the blower 15 via the first aperture 38. The external air flow 5 is discharged from the second semi-cylindrical volume 41 to the blower 15 via the third aperture 42. Finally, the external air flow 5 passes through the blower 15 and enters the downstream volume 17 where it is heat treated by the evaporator 21 and/or the heater 22. The heat treated air flow 2 is then discharged from the casing 3 to the vehicle interior 10 via at least one of the air delivery vents 11, 12, 13.

In FIG. 10, the blower 15 is activated. The source 25 of electrical power is active so that the filter 23 is heated to desorb the pollutants. The central plate 63 of the mixing flap 20 isolates the first semi-cylindrical volume 40 from the second semi-cylindrical volume 41. The mixing flap 20 is placed in the regeneration position in which the first upstand 36 and the second upstand 37 leave the outlet 32 of the interstitial space 27 uncovered so that the air can flow between the downstream volume 17 and the upstream volume 16 via the interstitial space 27. All the air distribution flaps 14 are placed in the closed position.

These arrangements allow a "filter regeneration" mode of operation in which the pollutants adsorbed by the filter 23 are discharged from the casing 3 after they have been desorbed. The recycling air flow 9 enters the first semi-cylindrical volume 40 via the recycling air intake vent 8 and the second aperture 39. The recycling air flow 9 then passes through the blower 15 and enters the downstream volume 17. Because the air distribution flaps 14 are all placed in the closed position, the downstream volume is a closed space having only the interstitial space 27 via which the recycling air flow 9 can escape. This flow therefore follows the interstitial space 27 to reach the outlet 32 of the interstitial volume 27, the second semi-cylindrical volume 41 and the upstream volume 16. The recycling air flow 9 then passes through the filter 23 where it collects the pollutants. The recycling air flow 9 laden with the pollutants is then discharged from the casing 3 via the external-air intake vent 4.

This causes the pollutants to be discharged from the casing 3 with no risk of contaminating the air contained within the vehicle interior 10. It also results in a discharge of any dust collected by the filter 23 during its operation in "full external" or in "partial recycling" mode from a passage of the recycling air flow 9 through the filter 23 in a direction that is the opposite to the direction followed by the external air flow 5 in these two modes.

The result of these arrangements is that the mixing flap 20 and, more particularly, the first upstand and the second upstand 37 with which it is equipped, advantageously constitutes a component that either allows or prevents passage of air inside the interstitial space 27, so that such a heating, ventilation and/or air conditioning installation 1 does not require the interstitial space 27 to be fitted with an additional flap.

In FIG. 11 to FIG. 14, the mixing flap 20 is a hinged flap comprising a plate 43 able to move about a pivot axis 44. The mixing flap 20 is able to move between a recycling position in which the mixing flap 20 closes off the external-air inlet vent 19 and an external position in which the mixing flap 20 closes off the recycling air intake vent 8. The mixing flap 20 can be placed in a regeneration position in which the mixing flap butts against the outlet 32 of the interstitial space 27. These arrangements seek to prevent air from circulating through the upstream volume 16 and the downstream volume 17 via the interstitial space 27 in the "full recycling" mode. These arrangements also seek to allow air to circulate through the upstream volume 16 and the downstream volume 17 via the interstitial space 27 in the "partial recycling" or "full external" mode. These arrangements also seek to allow air to circulate from the downstream volume 17 and the upstream volume 16 via the interstitial space 27 in the "regeneration" mode.

In FIG. 11 the blower 15 is activated. The source 25 of electrical power is inactive which means that the filter 23 is not heated to desorb the pollutants. The mixing flap 20 is in the recycling position. At least one air distribution flap 14 is in the open position.

These arrangements allow a "full recycling" mode of operation in which only the air contained within the vehicle interior 10 is heat treated. In this mode of operation, the recycling air flow 9 enters the mixing chamber 18 via the recycling air intake vent 8 from where it is drawn in by the blower 15. Next, the recycling air flow 9 passes through the blower 15. Next, the recycling air flow 9 is admitted to the downstream volume 17 in which the recycling air flow 9 is heat treated by the evaporator 21 and/or the heater 22. The heat treated air flow 2 is then discharged from the casing 3 to the vehicle interior 10 via at least one of the air delivery vents 11, 12, 13.

In FIG. 12, the blower 15 is activated. The source 25 of electrical power is inactive which means that the filter 23 is not heated to desorb the pollutants. The mixing flap 20 is placed in a middle position situated somewhere between the external position and the regeneration position. At least one air distribution flap 14 is in the open position.

These arrangements allow a "partial recycling" mode of operation in which the air contained within the vehicle interior 10 is mixed with external air before being heat treated. In this mode of operation, the recycling air flow 9 enters the mixing chamber 18 via the recycling air intake vent 8. The external air flow 5 enters the upstream volume 16 via the external-air intake vent 4. The external air flow 5 then passes through the filter 23 which holds back the pollutants. The external air flow 5 then enters the mixing chamber 18 via the external-air inlet vent 19. The external air flow 5 and the recycling air flow 9 are mixed together in and/or at the outlet of the mixing chamber 18 into a mixed air flow 33. This flow passes through the blower 15 and enters the downstream volume 17 where it is heat treated by the evaporator 21 and/or the heater 22. The heat treated air flow 2 is then discharged from the casing 3 to the vehicle interior 10 via at least one of the air delivery vents 11, 12, 13.

In FIG. 13, the blower 15 is activated. The source 25 of electrical power is inactive which means that the filter 23 is not heated to desorb the pollutants. The mixing flap 20 is placed in the external position. At least one air distribution flap 14 is in the open position.

These arrangements allow a "full external air" mode of operation in which only the external air flow 5 is heat treated. The external air flow 5 enters the upstream volume 16 via the external-air intake vent 4. The external air flow 5 then passes through the filter 23 which holds back the pollutants. The external air flow 5 enters the mixing chamber 18 via the external-air inlet vent 19. Finally, the external air flow 5 passes through the blower 15 and enters the downstream volume 17 where it is heat treated by the evaporator 21 and/or the heater 22. The heat treated air flow 2 is then discharged from the casing 3 to the vehicle interior 10 via at least one of the air delivery vents 11, 12, 13.

In FIG. 14, the blower 15 is activated. The source 25 of electrical power is active which means that the filter 23 is heated to desorb the pollutants. The mixing flap 20 is placed in the regeneration position. All the air distribution flaps 14 are placed in the closed position.

These arrangements allow a "filter regeneration" mode of operation in which the pollutants adsorbed by the filter 23 are discharged from the casing 3 after they have been desorbed. The recycling air flow 9 enters the mixing chamber 18. The recycling air flow 9 then passes through the blower 15 and enters the downstream volume 17. Because the air distribution flaps 14 are all placed in the closed position, the downstream volume is a closed space having only the interstitial space 27 via which the recycling air flow 9 can escape. This flow therefore follows the interstitial space 27 to reach the outlet 32 of the interstitial volume 27, the mixing chamber 18 and the upstream volume 16. The recycling air flow 9 then passes through the filter 23 where it collects the pollutants. The recycling air flow 9 laden with the pollutants is then discharged from the casing 3 via the external-air intake vent 4.

This causes the pollutants to be discharged from the casing 3 with no risk of contaminating the air contained within the vehicle interior 10. It also means that any dust that may have been collected by the filter 23 when it was operating in "full external" mode or in "partial recycling"

mode as a result of the recycling air flow 9 passing through the filter 23 in a direction the opposite to that followed by the external air flow 5 in these two modes to be discharged.

The result of these arrangements is that the mixing flap 20 advantageously constitutes a component that allows or prevents the passage of air through the interstitial space 27 so that such a heating, ventilation and/or air conditioning installation 1 does not require the interstitial space 27 to be fitted with an additional flap.

A final result is that the heating, ventilation and/or air conditioning installations 1 described hereinabove are simple and allow regeneration of the filter 23 which is easy to implement using a previously-described special combination of the interstitial space 27 and of the mixing flap 20 with appropriate use of the blower 15, of the distribution flap 14 and of the source 25 of electrical power connected to the resistor 24, without having to resort to any other component of said installation 1.

The invention claimed is:

1. A heating, ventilation and/or air conditioning installation (1) for a motor vehicle, said installation (1) comprising a casing (3) housing at least one blower (15) interposed between an upstream volume (16) and a downstream volume (17) which are delimited by the casing (3), the upstream volume (16) housing a mixing chamber (18) provided with a mixing flap (20), the casing (3) housing a filter (23), said installation (1) being equipped with regeneration means (27, 20, 24, 25) for regenerating the filter (23), wherein the regeneration means (27, 20, 24, 25, 14) for regenerating the filter (23) comprises an interstitial space (27) connecting the upstream volume (16) and the downstream volume (17), the regeneration means (27, 20, 24, 25, 14) for regenerating the filter (23) comprises the mixing flap (20) upstream of the at least one blower which constitutes a means of closing off an outlet (32) of the interstitial space (27) into the upstream volume (16), the interstitial space (27) being included within the casing (3) and formed between a wall (28) delimiting the casing (3) and the at least one blower (15) and extending longitudinally along the at least one blower (15) and lying entirely between the upstream volume (16) and the downstream volume (17) and the filter (23) being located upstream of the mixing chamber (18), the interstitial space (22) being an empty volume containing no blower and constituting a path by-passing the at least one blower (15).

2. The installation (1) as claimed in 1, wherein the interstitial space (27) is adjacent to the at least one blower (15) and to the mixing chamber (18).

3. The installation (1) as claimed in claim 1, wherein the regeneration means (27, 20, 24, 25, 14) for regenerating the filter (23) comprise a resistor (24) with which the filter (23) is equipped, the resistor (24) being associated with a source (25) of electrical power.

4. The installation (1) as claimed in claim 1, wherein the regeneration means (27, 20, 24, 25, 14) for regenerating the filter (23) comprise at least one air distribution flap (14) with which an air delivery vent (11, 12, 13) is equipped.

5. The installation (1) as claimed in claim 1, wherein the filter (23) is interposed between an external-air intake vent (4) and the mixing chamber (18).

6. A method of regenerating the filter (23) with which an installation (1) according to claim 1 is equipped, wherein the method comprises the following operations:
placing the mixing flap (20) in a regeneration position so as to leave the outlet (32) of the interstitial space (27), an external-air intake vent (4) and a recycling-air intake vent (8) uncovered,
placing the air distribution flap (14) in the closed position,
switching on the source (25) of electrical power of the resistor (24), and
switching on the at least one blower (15).

7. The installation (1) as claimed in claim 2, wherein the regeneration means (27, 20, 24, 25, 14) for regenerating the filter (23) comprises the mixing flap (20) which constitutes a means of closing off an outlet (32) of the interstitial space (27) into the upstream volume (16).

8. The installation (1) as claimed in claim 2, wherein the regeneration means (27, 20, 24, 25, 14) for regenerating the filter (23) comprises a resistor (24) with which the filter (23) is equipped, the resistor (24) being associated with a source (25) of electrical power.

9. The installation (1) as claimed in claim 1, wherein the regeneration means (27, 20, 24, 25, 14) for regenerating the filter (23) comprises a resistor (24) with which the filter (23) is equipped, the resistor (24) being associated with a source (25) of electrical power.

10. The installation (1) as claimed in claim 7, wherein the regeneration means (27, 20, 24, 25, 14) for regenerating the filter (23) comprises a resistor (24) with which the filter (23) is equipped, the resistor (24) being associated with a source (25) of electrical power.

11. The installation (1) as claimed in claim 1, wherein the regeneration means (27, 20, 24, 25, 14) for regenerating the filter (23) comprises at least one air distribution flap (14) with which an air delivery vent (11, 12, 13) is equipped.

12. The installation (1) as claimed in claim 3, wherein the regeneration means (27, 20, 24, 25, 14) for regenerating the filter (23) comprises at least one air distribution flap (14) with which an air delivery vent (11, 12, 13) is equipped.

* * * * *